United States Patent [19]
Heredia

[11] Patent Number: 5,167,171
[45] Date of Patent: Dec. 1, 1992

[54] UNIVERSAL KEY BLANK AND KEY DUPLICATION METHOD

[75] Inventor: George L. Heredia, Paradise Valley, Ariz.

[73] Assignee: Axxess Entry Technologies, Tempe, Ariz.

[21] Appl. No.: 650,431

[22] Filed: Feb. 4, 1991

Related U.S. Application Data

[63] Continuation-in-part of Ser. No. 425,731, Oct. 19, 1989, abandoned, which is a continuation-in-part of Ser. No. 260,815, Oct. 21, 1988, abandoned.

[51] Int. Cl.⁵ .............................................. B21K 13/00
[52] U.S. Cl. ......................................... 76/110; 409/130
[58] Field of Search ................ 76/110; 70/340; 409/130

[56] References Cited

U.S. PATENT DOCUMENTS

| | | | |
|---|---|---|---|
| 830,014 | 9/1906 | Shaw et al. | 70/340 |
| 1,302,432 | 4/1919 | Raymond | 70/340 |
| 1,785,634 | 12/1930 | Lawrence | 70/340 |
| 1,922,438 | 8/1933 | Hurol | 70/340 |
| 2,065,294 | 12/1936 | Simon | 76/110 |
| 3,439,516 | 4/1969 | Quillen | 70/411 |
| 3,841,175 | 10/1974 | Comtois | 76/110 |
| 4,102,247 | 7/1978 | Fanberg | 76/110 |

OTHER PUBLICATIONS

Brochure: Taylor Lock—Key Machines, printed by the Taylor Lock Company re Model KD8 and Model KD9 (1 page).
Brochure: ILCO borchure—printed in the ILCO Unican Corp. Catalog No. 60R (1984 Edition ) (2 pages).
Brochure: SILCA brochure—printed in the SILCA Catalogo Cenerale n. 21 (Italian) (5 pages).
Brochure: Cole brochure—printed in the COLE key training manual re key duplicating (5 pages).

*Primary Examiner*—Roscoe V. Parker
*Attorney, Agent, or Firm*—Cahill, Sutton & Thomas

[57] ABSTRACT

A universal key blank incorporates special geometry enabling it to be used as a blank for duplicating a variety of related but geometrically dissimilar keys. The universal key blank functions with a lock having a lock entrance slot with opposing sides and first and second opposed key interface ribs protruding from the sides of the slot with relative vertical alignment to rib geometry configured to engage first and second grooves formed in opposing sides of the blade of the universal key blank. A novel method duplicates keys by measuring and reproducing a reference distance defined by the spacing between the bit notch pattern and the key reference surface forming the first groove of the master key.

6 Claims, 12 Drawing Sheets

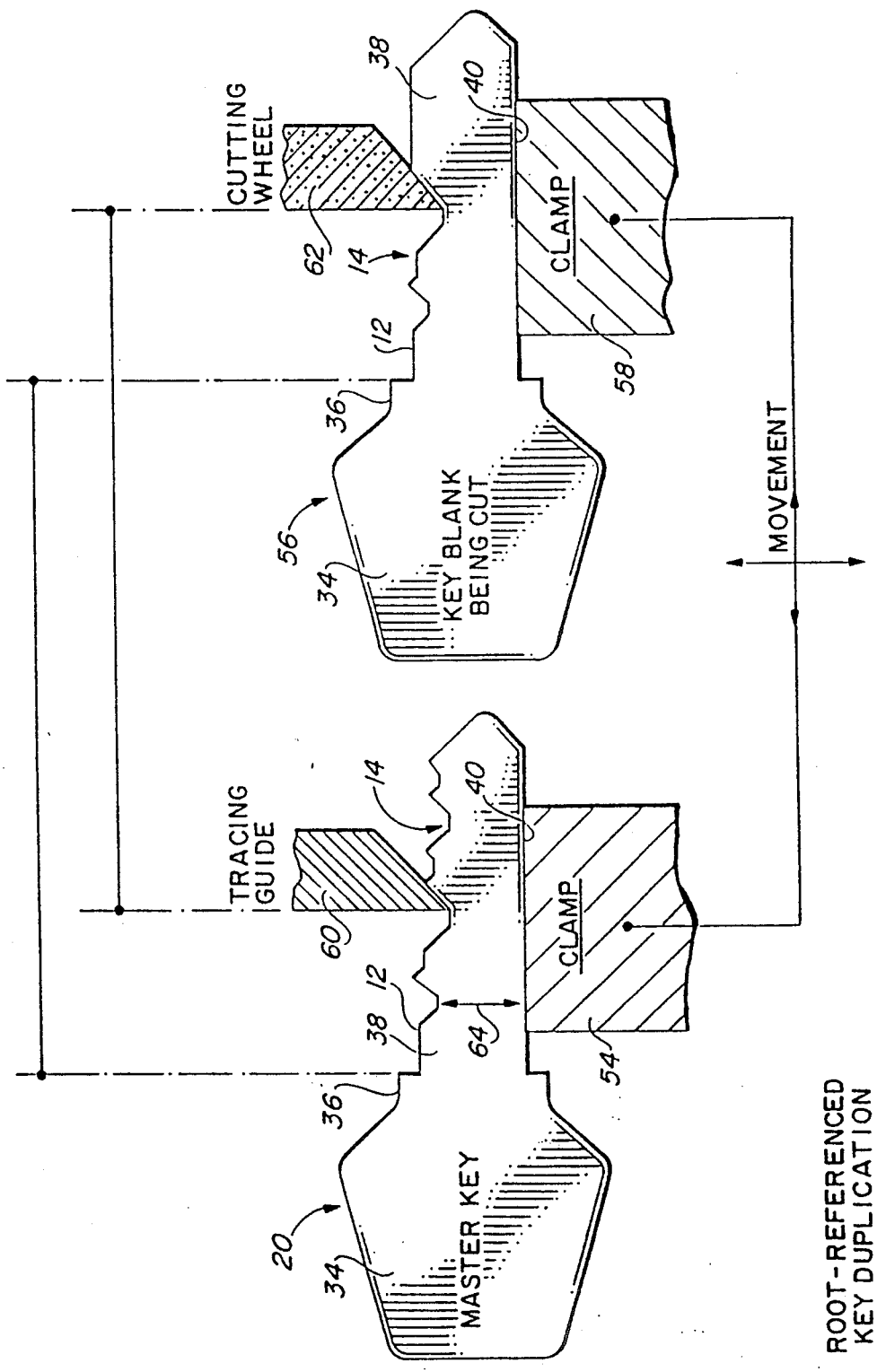

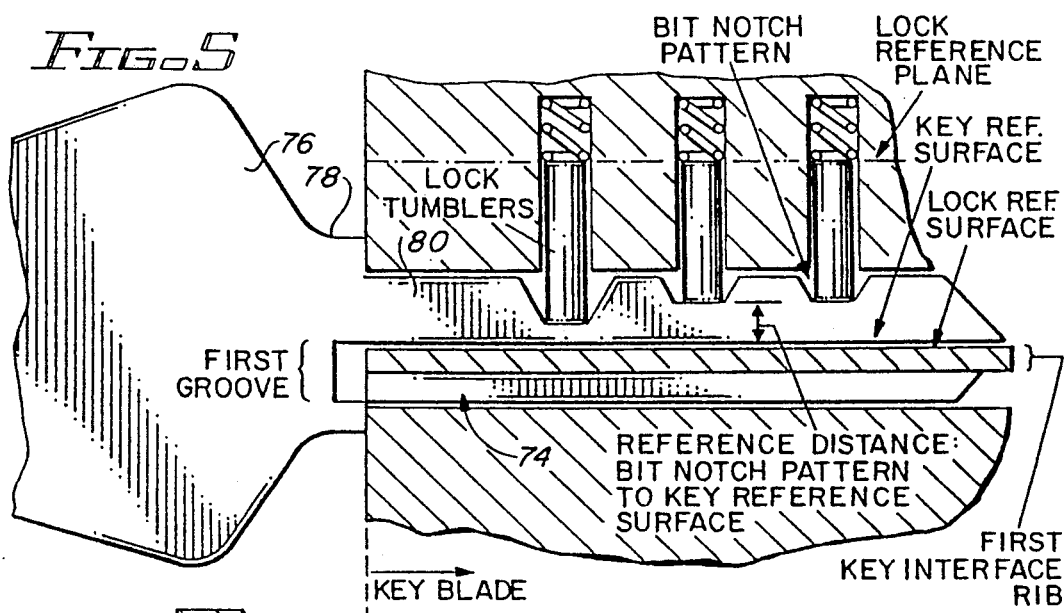
FIG. 5
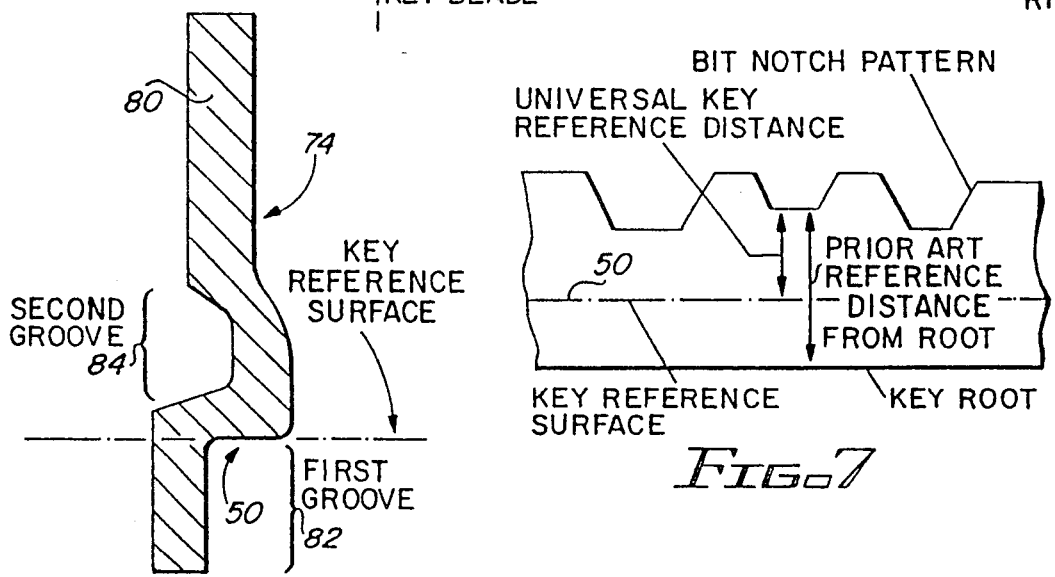
FIG. 6
FIG. 7
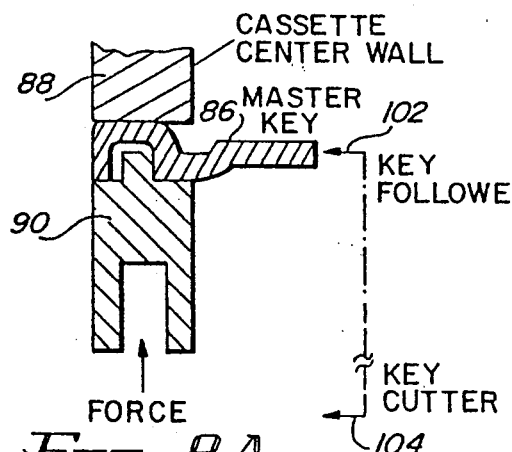
FIG. 8A
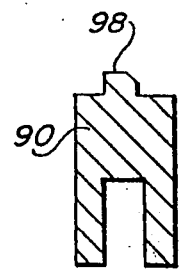
FIG. 8B

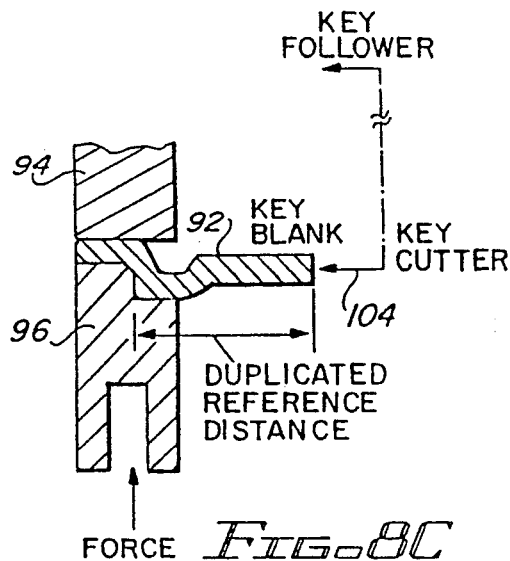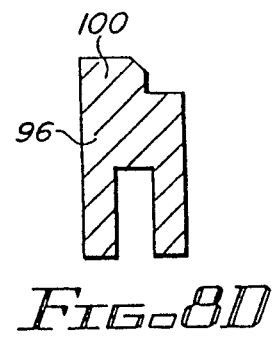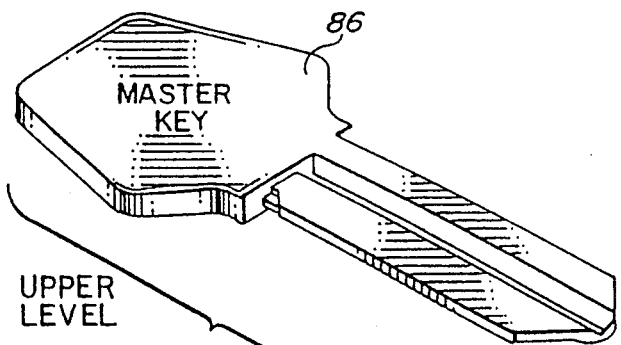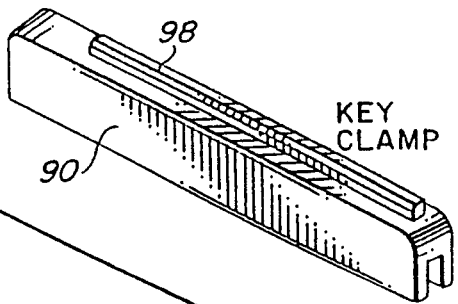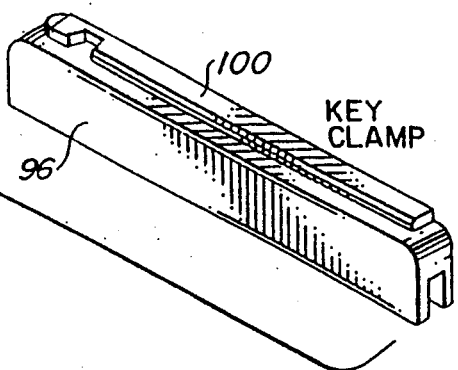

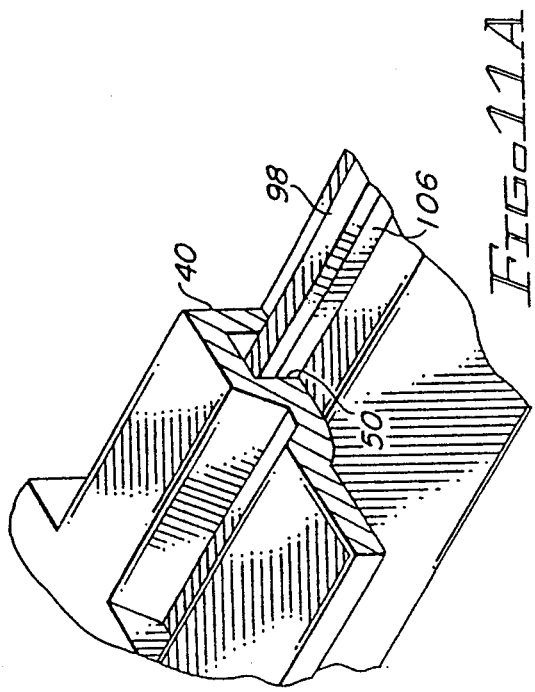
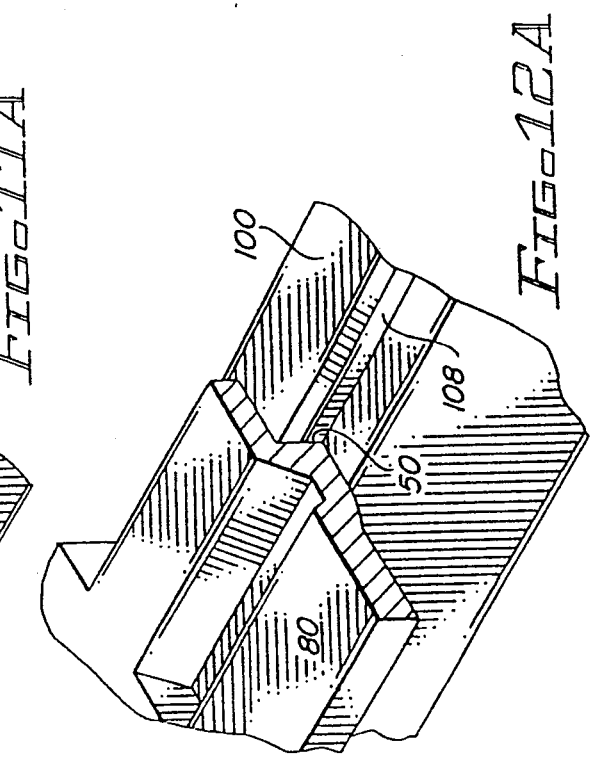
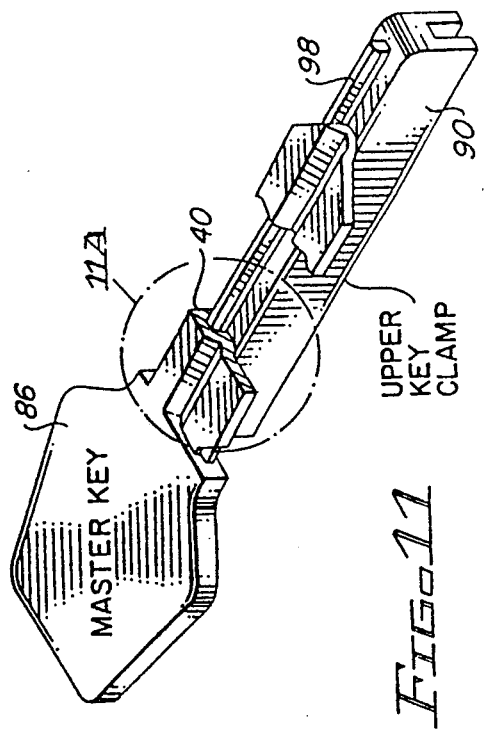
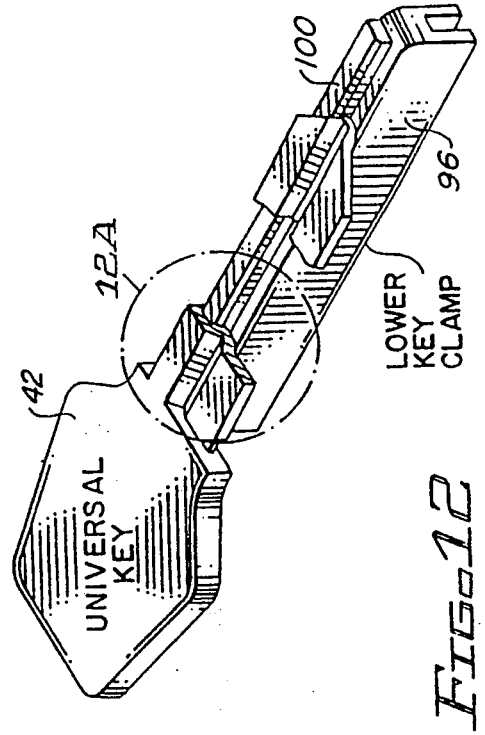

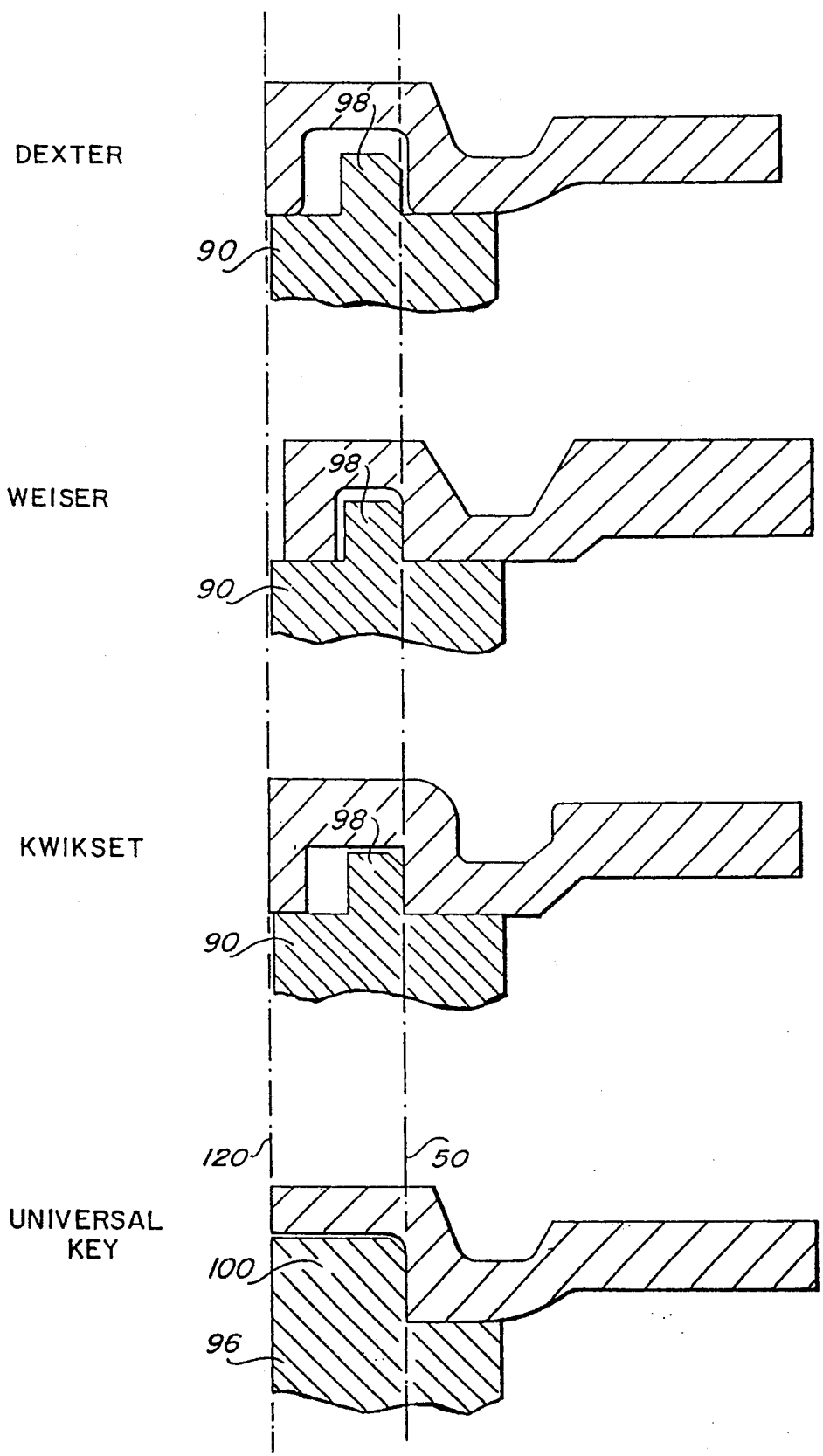

WEISER
DEXTER
ARROW
KWIKSET
INDEPENDENT
WESLOCK

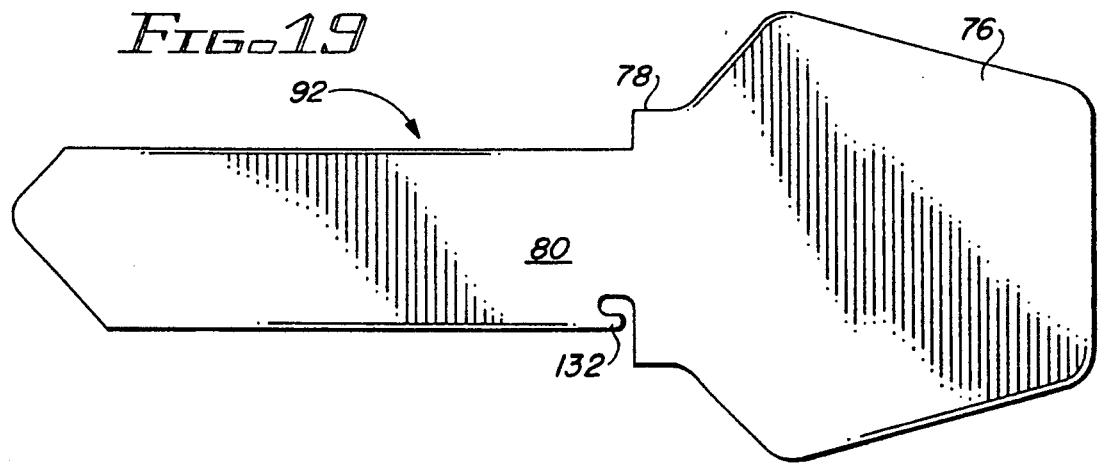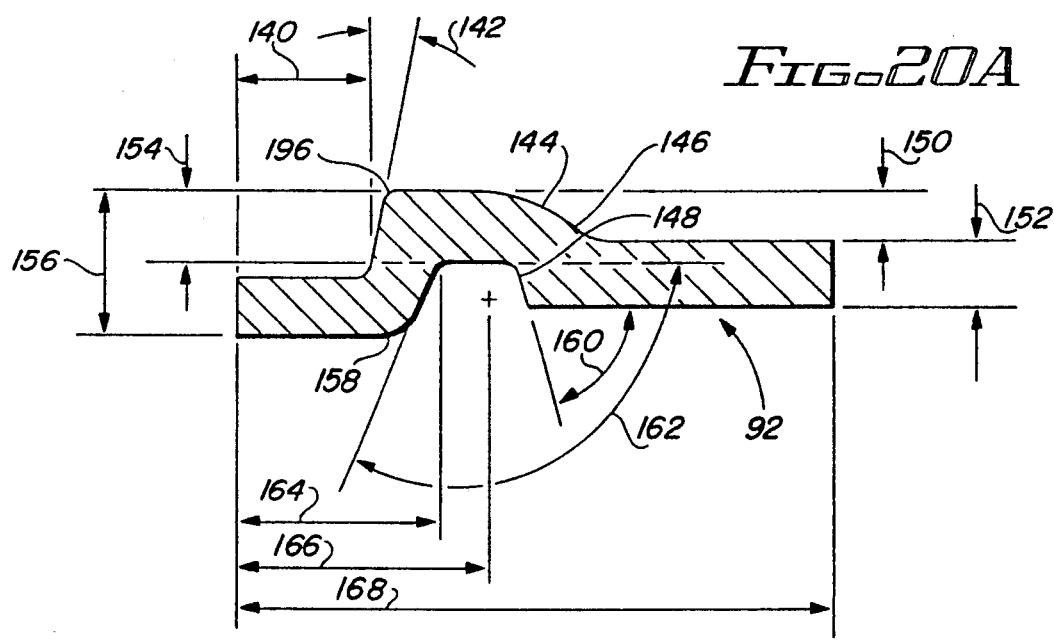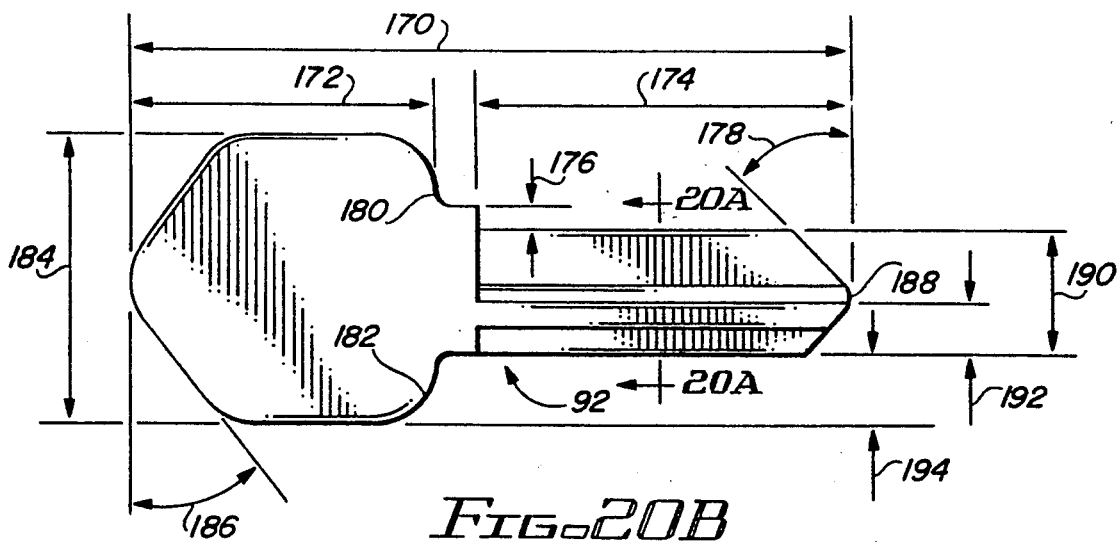

UNIVERSAL KEY BLANK AND KEY DUPLICATION METHOD

This is a continuation-in-part of U.S. patent application Ser. No. 425,731 filed on Oct. 19, 1989 now abandoned, and entitled "METHOD AND APPARATUS FOR ALIGNING AND CUTTING SINGLE-SIDED AND DOUBLE-SIDED which is a continuation-in-part of U.S. patent application Ser. No. 260,815, filed on Oct. 21, 1988 now abandoned, and entitled "KEY CUTTING MACHINE AND METHOD."

BACKGROUND OF THE INVENTION

1. Field of the Invention

This invention relates to keys having head, shoulder and blade sections with a bit notch pattern formed along one edge of the key blade with at least one longitudinally extending groove formed in the side of a blade.

2. Description of the Prior Art

As illustrated in FIGS. 1A and 2, a typical key for a house lock includes a key blade having a first edge 12 in which is formed a bit notch pattern 14 uniquely configured to match variable length lock tumblers in a typical rotary cylinder lock of the type used for residential lock applications.

FIG. 1A illustrates the cylindrical face 16 of such a lock which includes a lock entrance slot 18 for receiving a key 20. Entrance slot 18 includes opposing sides 22 and 24. Vertically spaced apart first and second opposed key interface ribs 26 and 28 protrude from sides 22 and 24. Entrance slot 18 also includes space apart upper and lower edges 30 and 32. As illustrated in FIG. 1B, the root 40 of the Weslock key rests upon and is vertically indexed by lower edge 32 of lock entrance slot 16, rather than by key reference surface 50.

As illustrated in FIG. 2, key 20 includes a head 34, a shoulder 36 abutting the head and a longitudinally extending blade 38 coupled to shoulder 36 and including a root 40 and a bitted surface with a unique bit notch pattern 14 for actuating the matching lock.

As illustrated in FIG. 1A, key 20 also includes first and second vertically displaced, longitudinally extending grooves formed in opposing sides of the key. First groove 46 includes a key reference surface 50 for engaging a lock reference surface 52.

As illustrated in FIG. 2, master key 20 having an existing bit notch pattern 14 is duplicated by locking it in a first key clamp 54 of a conventional prior art root-referenced key duplication machine. Key root 40 of master key 20 is placed in abutting contact with a key alignment surface of clamp 54 while geometrically identical key blank 56 is secured in key clamp 58 with its key root 40 aligned to coincide with the alignment of key root 40 of master key 20.

The bit notch pattern 14 of master key 20 is then duplicated on edge 12 of key blank 56 by laterally displacing the key tracing guide 60 along the bit notch pattern 14 of master key 20. Because the rotary cutting wheel 62 is coupled to tracing guide 60 to accurately reproduce both lateral and vertical displacements of the tracing guide as it follows the bit notch pattern of master key 20, cutting wheel 62 accurately reproduces the bit notch pattern of master key 20 into the blade of key blank 56.

In accomplishing the key duplication process described above, prior art root-referenced key duplicating machines measure and reproduce a varying magnitude reference distance 64 defined by the spacing at given lateral positions along the key blade between key root 40 and the bit notch pattern 14. Because according to prior art practice key blank 56 must be geometrically identical to master key 20, cutting wheel 62 accurately reproduces the master key reference distance 64 as a function of lateral position and thereby accurately duplicates the bit notch pattern of master key 20 onto key blank 56.

A primary problem with such prior art key duplication systems is that a key duplication business must maintain an exceedingly large inventory of key blanks geometrically identical to the master keys used by each different brand of house locks to produce operable root-referenced copies of a master key. For house keys, the most popular keys and locks are manufactured by nine different companies and the geometry of each of these nine different keys differs for each different manufacturer. To duplicate house keys, a locksmith must maintain an inventory of nine different house key blanks to properly serve the public.

As illustrated in FIG. 3, in some instances, a key blank geometrically dissimilar to a master key for a different lock brand can be physically inserted into the lock entrance slot of a lock for which it was not intended. FIG. 3 illustrates the problems which arise when a key duplicator uses the prior art root-referenced key duplication system described in connection with FIG. 2 to duplicate a master key onto a geometrically dissimilar key blank.

In FIG. 3, reference lines 66 and 68 are equal in length and indicate that a root-referenced key duplicator has accurately reproduced the root to bit notch distance of the master key onto the dissimilar key blank. Because the spacing between key root 40 and key reference surface 50 of the master key is significantly greater than the distance between key root 40 and key reference surface 50 of the dissimilar key blank, the vertical elevation of the bit notch depth of the dissimilar key (designated by reference number 70) will be displaced substantially above the corresponding bit notch depth elevation of the master key (designated by reference number 72). Accordingly, although the dissimilar key blank may include a bit notch pattern identical to the bit notch pattern of the master key, the dissimilar key blank will not actuate the lock matching the master key bit notch pattern.

Prior art root-referenced key duplication devices therefore typically duplicate house keys by using key blanks geometrically identical to each of the nine different types of commonly used master keys.

U.S. Pat. No. 3,841,175 (Comtois) discloses a method for cutting off the root of previously duplicated house keys to prevent their further duplication on root-referenced key duplication machines. According to the teachings of this patent, a house key is first duplicated onto a geometrically identical key blank. The duplicated key is then further machined to remove the root surface from the key destroying the ability of a root-referenced key duplication machine to accurately reproduce the root to bit notch pattern geometry of the original key. As a result, the rootless duplicate key represents a relatively secure key which cannot be duplicated using ordinary root-referenced key duplication techniques.

SUMMARY OF THE INVENTION

It is therefore a primary object of the present invention to provide a universal key blank having a unique geometry enabling the bit notch pattern of a variety of different brands of house keys to be reproduced onto the blade of the universal key blank such that the duplicated key will actuate a variety of different brands of locks.

Another object of the present invention is to provide a universal key blank which can be used to duplicate seven of the nine primary house key brands.

Yet another object of the present invention is to provide a universal key blank which can successfully duplicate a geometrically dissimilar master key.

Still another object of the present invention is to provide a key duplication method which duplicates the bit notch pattern of a master key onto either an identical key blank or onto a dissimilar key blank by measuring and reproducing a reference distance equal to the spacing between the bit notch pattern and a key reference surface forming a part of a longitudinally extending groove formed in the key blade.

Briefly stated, and in accord with one embodiment of the invention, a universal key blank is capable of being cut to operate both a first lock actuated by a first matching key and a second lock actuated by a second matching key geometrically dissimilar to the first key and incompatible with the first lock. The first and second keys each include a head, a shoulder abutting the head, a longitudinally extending blade coupled to the shoulder with a root and a bitted surface. The bitted surface includes a length, a width, opposing sides and a unique bit notch pattern for actuating the matching lock. Each key further includes first and second vertically displaced, longitudinally extending grooves formed in the opposing sides of the blade. The first groove includes a key reference surface for engaging a lock reference surface and for defining a reference distance between the bit notch pattern and the key reference surface. The first and second locks each include a lock entrance slot having opposing sides and first and second opposed key interface ribs protruding from the sides of the slot with relative vertical alignment and rib geometry configured to engage the first and second grooves of the first and second keys. The lock reference surface forms a part of the first key interface rib. The entrance slot of the first and second locks is dimensioned to permit penetration of the key blade but not the key shoulder of the first and second keys to thereby longitudinally align the bit notch pattern of the key with the lock. The universal key blank comprises a head and a shoulder abutting the head dimensioned to prevent penetration of the shoulder into the lock entrance slot of both the first and second locks. The universal key further includes a blade coupled to the shoulder. The blade includes a bitted surface having a length and a height adequate to receive a bit notch pattern duplicating the bit notch pattern of either the first or second keys. The blade further includes a width enabling the blade to be inserted through the entrance slot of both the first and second locks. First and second longitudinal grooves are formed on opposing sides of the blade and are configured to penetrate through the entrance slot and interface with the first and second key interface ribs of both the first and second locks. The first groove includes a key reference surface defining a reference distance between the duplicated bit notch pattern and the key reference surface of the universal key blank equal to the corresponding reference distance of the duplicated first or second key and for interfacing with the lock reference surface of the duplicated key lock to actuate that lock.

DESCRIPTION OF THE DRAWINGS

The invention is pointed out with particularity in the appended claims. However, other objects and advantages together with the operation of the invention may be better understood by reference to the following detailed description taken in connection with the following illustrations, wherein:

FIG. 2 is a diagrammatic illustration of a prior art root-referenced key duplication machine.

FIG. 5 illustrates a universal key inserted into a typical rotary cylinder lock.

FIG. 6 illustrates a sectional view taken through the blade section of the universal key illustrated in FIG. 5.

FIG. 7 is a diagram illustrating the differences between prior art root-referenced key duplication methods and the distinct key reference distance used in connection with the key duplication method of the present invention.

FIGS. 8A, 8B, 8C and 8D illustrate the interrelationship between the master key, the master key clamp, the universal key and the universal key clamp for the key duplication method of the present invention.

FIG. 9 is a perspective view showing the interrelationship between a master key and a groove referenced clamp of the present invention.

FIG. 10 illustrates a perspective view showing the interrelationship between a universal key blank and a groove referenced clamp of the present invention.

FIG. 11 and 11A illustrate in greater detail the geometric relationship between the groove of a master key and the related key clamp.

FIG. 12 and 12A illustrate the geometric relationship between the groove of a universal key blank and the related key clamp.

FIG. 14B illustrates the interrelationship of these keys with the key clamping jaws.

FIG. 19 illustrates a second embodiment of a frangible notch of the universal key for accommodating master keys with varying blade height requirements.

FIGS. 20A and 20B represent sectional and elevational views defining the dimensions of a preferred embodiment of the universal key blank.

DESCRIPTION OF THE PREFERRED EMBODIMENT

In order to better illustrate the advantages of the invention and its contributions to the art, a preferred hardware embodiment of the invention will now be described in some detail.

Figure 4:
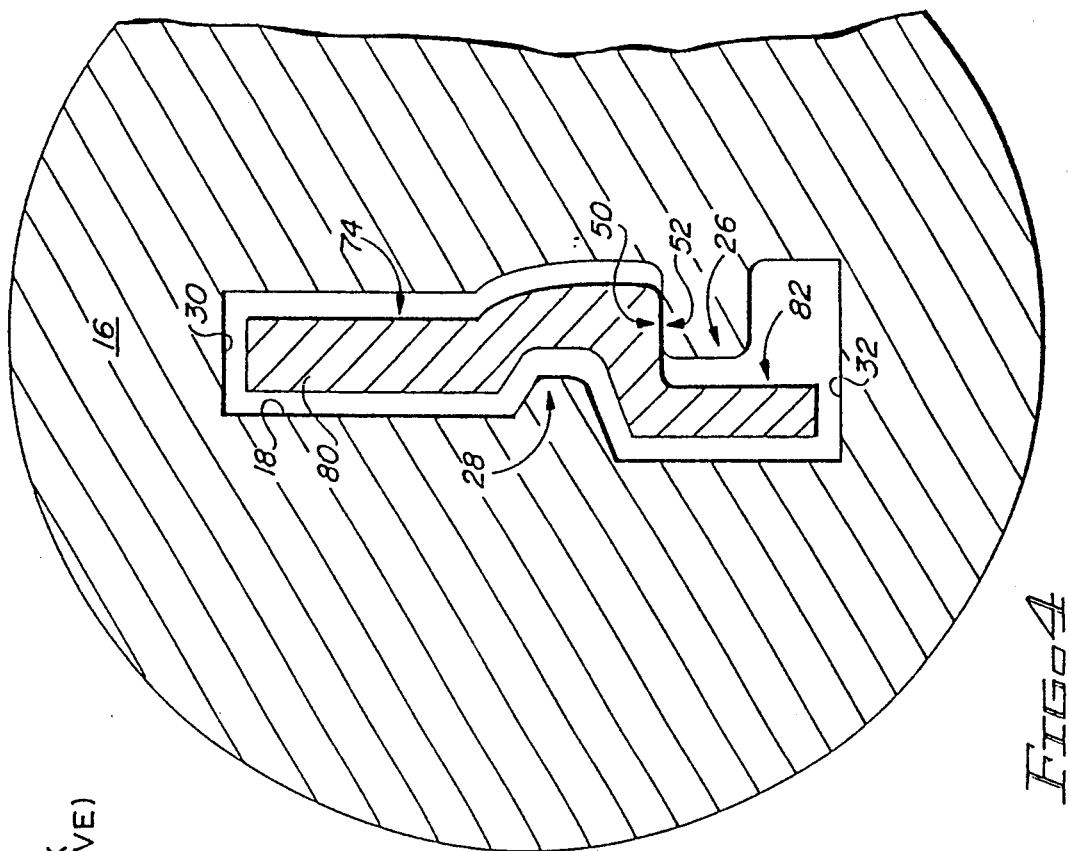
FIG. 4 illustrates a universal key blank inserted in the lock entrance slot of a conventional rotary cylinder lock.
Figure 3:
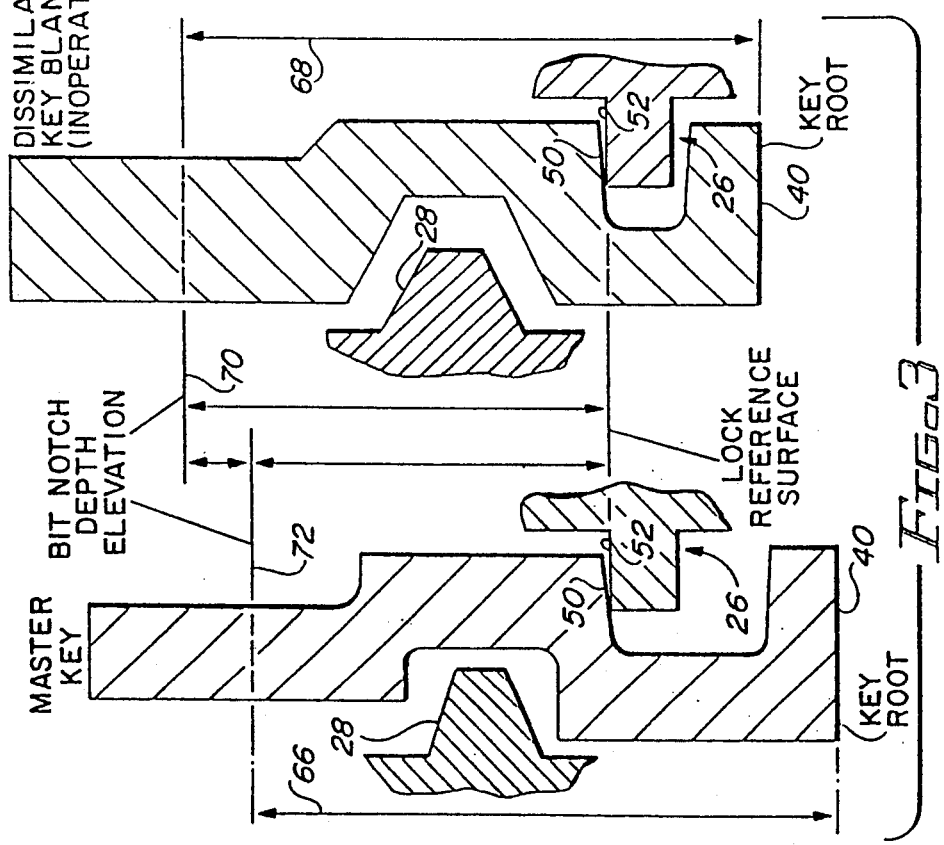
FIG. 3 illustrates the effect of using a geometrically dissimilar key blank to duplicate the bit notch pattern of a master key.

Referring now to FIGS. 4, 5 and 6, universal key blank 74 includes a head 76, a shoulder 78 and a blade 80. In carefully examining the geometric interrelationships between the nine most common house keys and the lock entrance slot, it was found that the root of only one (the Weslock key) of these nine keys actually contacted lower edge 32 of lock entrance slot 18 and thereby vertically indexed and controlled the elevation of the bit notch pattern with respect to that reference surface. As illustrated in FIG. 1, in all other house keys, a small gap was maintained between key root 40 and lower edge 32 of the lock entrance slot. Accordingly, for such keys, vertical indexing of the bit notch pattern was accomplished by the linear, longitudinally extending interface between key reference surface 50 of first groove 46 and the parallel-oriented lock reference surface 52 of first key interface rib 26. Accordingly, the structure of blade 80 of the universal key blank was modified as illustrated in FIGS. 4-6 to omit the key root 40 which represents a standard feature of all house keys and is required to provide for root-referenced key duplication. Because as illustrated in FIG. 3 the spacing between root 40 and key reference surface 50 varies significantly for different master keys manufactured by different lock manufacturers, elimination of the root provided additional flexibility to design a universal key blank which could successfully duplicate numerous geometrically different master keys.

As illustrated in FIGS. 5 and 6, the universal key blank includes an inverted L-shaped first groove 82 which completely omits the key root which formed a standard element of all popular prior art house keys.

The specific configuration and relative geometry of first groove 82 and second groove 84 was designed to accommodate the unique and different structure of the lock entrance slots of seven of the nine most common house keys. The universal key blank is not compatible with either Schlage or Yale locks. The universal key is compatible with the most common versions of each of the following house locks: Kwikset, Weiser, Weslock, National, Arrow, Independent, Dexter.

Because the key root used as the primary key duplicating reference surface for all popular prior art house keys has been eliminated, a new key reference surface illustrated in FIGS. 4, 5 and 6 was defined to provide for accurate reproduction of the bit notch pattern of a master key onto the universal key blank at the critical elevation with the lock. If the level of height is not placed at the precisely defined elevation necessary to align the lock tumblers with the lock reference plane as shown in FIG. 5, the universal key will not actuate the lock even though the bit notch patterns on the master key and universal key have identical contours.

As illustrated in FIG. 5, the reference distance used to vertically index the bit notch pattern of the universal key blank is defined by the spacing between the bit notch pattern and the upper key reference surface 50 of first groove 82. In five of the compatible brand name house keys identified above, this key reference surface is horizontally oriented as illustrated in FIG. 1. For the National and Arrow keys, this key reference surface is inclined.

As illustrated in FIG. 5, the critical reference distance for accurately duplicating and vertically indexing the bit notch pattern of a master key onto the universal key blank is defined as the vertical distance between key reference surface 50 and the bit notch pattern at given longitudinal locations along the blade 80 of the universal key. FIG. 5 designates the reference distance for a particular longitudinal location along blade 80 of the universal key.

As illustrated in FIG. 7, use of key reference surface 50 as a universal key vertical indexing reference distance accurately reproduces the bit notch pattern of the master key at the exact vertical elevation within the lock required to actuate the lock tumblers of a lock in which the universal key is inserted. FIG. 7 further shows that a significantly different root-based reference distance is used for prior art keys.

Referring now to FIG. 8, one form of mechanism capable of accurately measuring and reproducing the reference distance and bit notch pattern from a standard master key onto the rootless universal key of the present invention will now be described. The specifics of this unique type of key cutting machine are disclosed in allowed U.S. patent application Ser. No. 425,731, filed on Oct. 19, 1989 and entitled "Method and Apparatus for Aligning and Cutting Single-Sided and Double-Sided Keys," which is hereby incorporated by reference.

This key duplication structure illustrated in FIG. 8 can be formed as a part of a removable key duplication cassette for a key cutting machine commercially available from Axxess Entry Technologies of Tempe, Ariz. The structure of that commercially available key cutting machine and its removable key cutting cassette are descried in detail in U.S. patent application Ser. No. 425,731 filed on Oct. 19, 1989 and entitled "METHOD AND APPARATUS FOR ALIGNING AND CUTTING SINGLE-SIDED AND DOUBLE-SIDED KEYS." The disclosure of that patent application is hereby incorporated by reference.

For cassette-based key duplication systems such as the Axxess Entry Technologies system illustrated in FIG. 8, a master key 86 is clamped into a horizontal position between vertically spaced apart clamping jaws 88 and 90 as illustrated in FIG. 8A. A universal key blank 92 is clamped in a horizontal position as illustrated in FIG. 8C between vertically spaced apart clamping jaws 94 and 96. The clamping fixtures illustrated in FIG. 8A and 8C are typically vertically spaced apart and laterally aligned with the universal key clamping fixture as illustrated. Alternative but equivalent clamp alignments would be readily apparent to one of ordinary skill in the art.

FIG. 8B illustrates clamping jaw 90 in greater detail and particularly illustrates the notch alignment surface 98, the right side of which engages, laterally aligns and indexes key reference surface 50 of master key 86 as shown in FIG. 8A.

As illustrated in FIG. 8D, universal key clamping jaw 96 also includes a notch alignment surface 100 for engaging, laterally aligning and indexing the key reference surface 50 of universal key 92. The utilization of a laterally elongated notch alignment surface 100 in clamping jaw 96 provides for enhanced stability of universal key blank 92. The increased width of the notch alignment surface 100 can be provided since the universal key blank typically does not incorporate a root. The root-accommodating narrower width notch alignment surface 98 as illustrated in FIG. 8B could be substituted for the wider notch alignment surface 100 illustrated in FIG. 8D.

As illustrated in FIGS. 8A and 8C, longitudinally displacements of key follower 102 traces the bit notch pattern of master key 86 and causes interconnected key cutter 104 to accurately reproduce the bit notch pattern of master key 86 onto the corresponding edge of universal key blank 92 at a reference distance duplicating the master key reference distance, assuring correct vertical indexing of the universal key bit notch pattern.

FIGS. 9 and 10 illustrate how master key 86 and universal key blank 92 are loaded into the key duplication cassette of the Axxess key duplication machine described above. FIGS. 11 and 12 illustrate master key 86 and universal key blank 92 fully inserted into and longitudinally indexed with respect to one another as a result of establishing contact between the key shoulders and the entrance slot of the Axxess key duplication cassette. Lateral registration of master key 86 and universal key blank 92 is established by laterally displacing the two keys until they firmly and uniformly contact the lateral alignment surface 106 of notch alignment surface 98 and the corresponding lateral alignment surface 108 of notch alignment surface 100.

Figure 13:
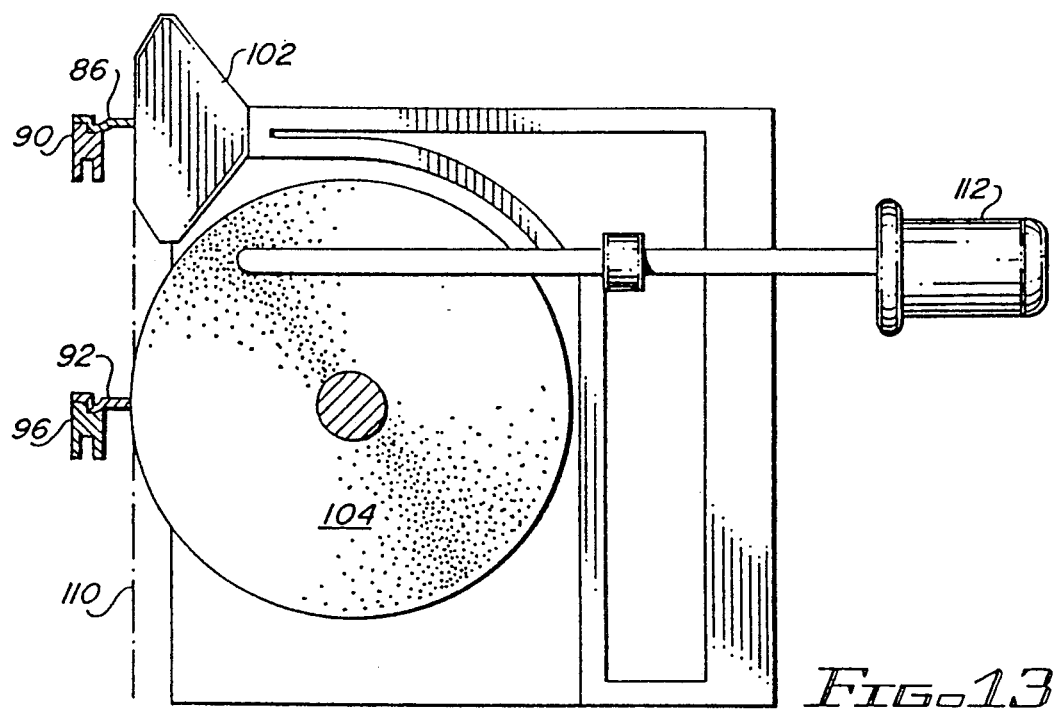
FIG. 13 illustrates a master key and universal key blank as illustrated in FIG. 8 further showing the key follower and cutting wheel of a key cutting machine suitable for implementing the key duplication method of the present invention.

FIG. 13 schematically illustrates relevant structure of the key duplication cassette for the Axxess key cutting machine. As illustrated by the vertical reference axis 110, clamping jaws 90 and 96 vertically align the bitted edge surfaces of master key 86 and universal key blank 92.

A laterally displaceable set button 112 enables a user of the Axxess key cutting machine to laterally displace both key follower 102 and key cutter 104 into contact with the edge surfaces of master key 86 and universal key blank 92 to displace the key reference surfaces 50 of those keys into firm abutting contact with lateral alignment surfaces 106 and 108. A more detailed explanation of the structure and function of this set button lateral displacement mechanism is included in U.S. patent application Ser. No. 425,731.

Figure 14A:
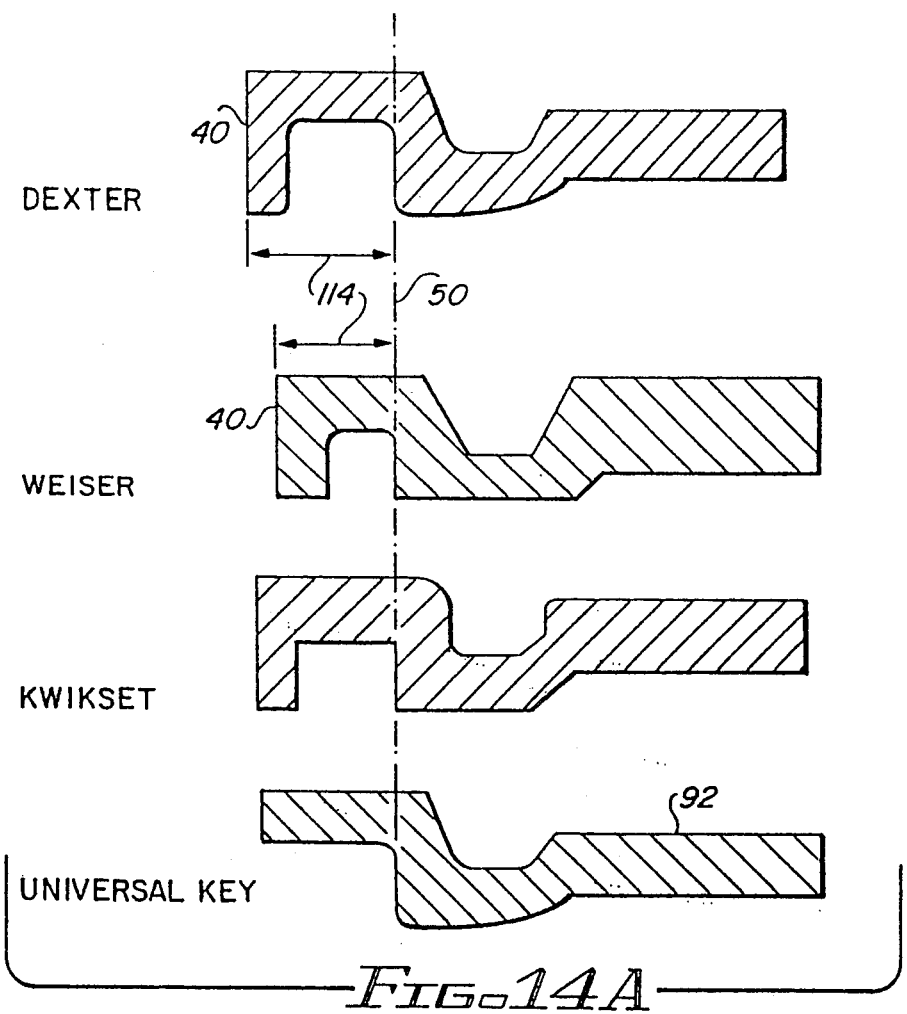
FIG. 14A illustrates a series of aligned sectional views showing the relationship between the universal key blank of the present invention and three different brand master keys.

FIG. 14A illustrates sectional views of the blade sections of universal key blank 92 and three other standard house keys which can be successfully duplicated by universal key 92. As illustrated by the dimension lines designated by reference number 114, the distance between key reference surface 50 and the key root 40 of the Dexter and Weiser key blanks differ significantly. Nevertheless, universal key blank 92 because of its unique geometric structure is able to faithfully reproduce the contour and vertical indexing of the relevant lock actuation surfaces of all the illustrated brand name master keys and will fit through the corresponding lock entrance slots as well. FIG. 14A shows how clamping jaws 90 and 96 fit with and index the key blanks illustrated.

Figure 15A:
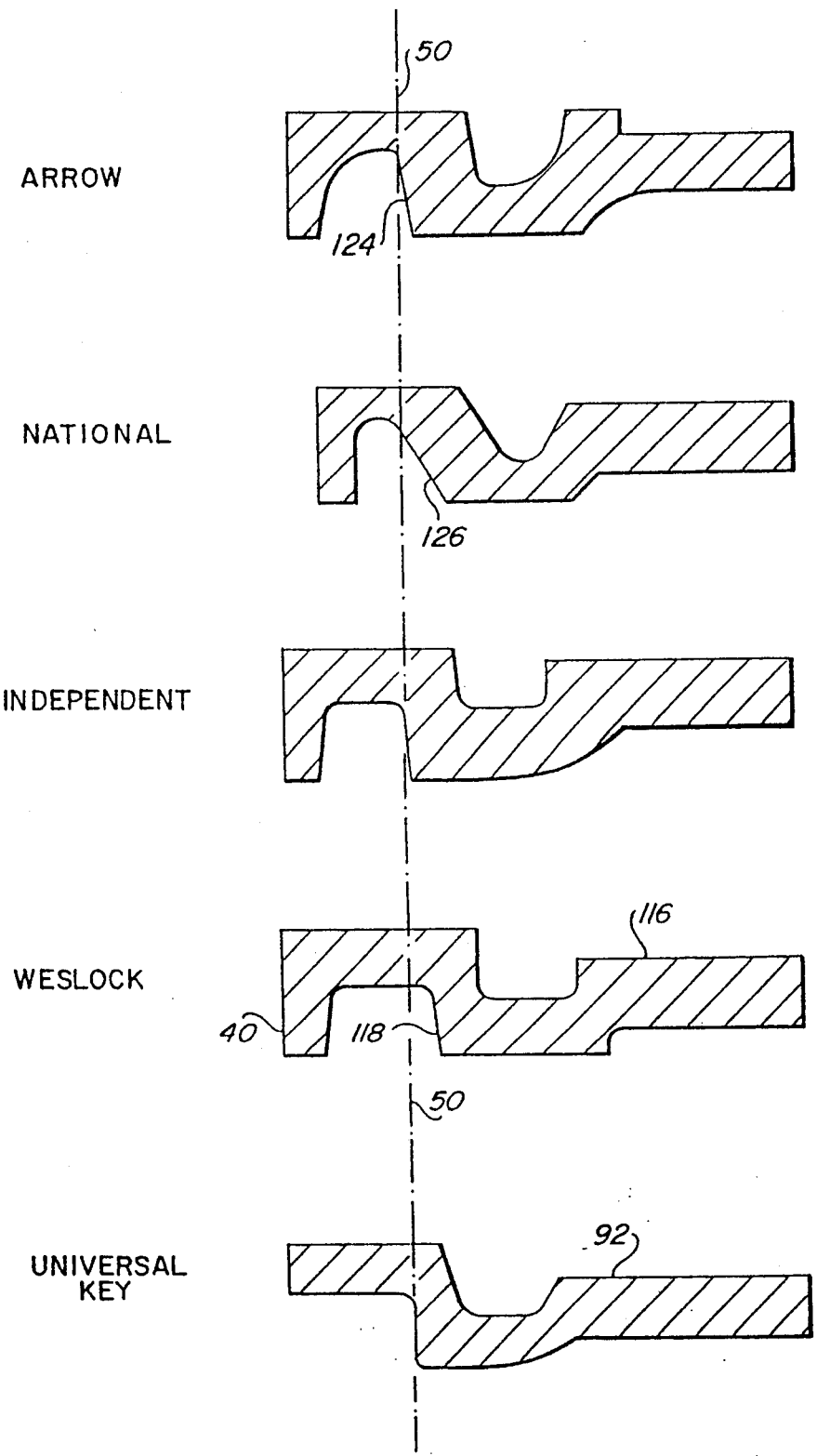
FIG. 15A illustrates a series of aligned sectional views showing the relationship between the universal key blank of the present invention and four different brand master keys.

FIG. 15A illustrates four other different brand name master keys for which universal key blank 92 can be substituted. The Weslock key designated by reference number 116 includes a key reference surface 118 which is offset to the right of key reference surface 50 of universal key blank 92. The Weslock key is vertically indexed in the lock entrance slot 16 by establishing functional contact between the key root and the lower edge 32 of the Weslock lock entrance slot to vertically index its bit notch pattern with the lock tumblers. FIG. 15A shows how clamping jaw 90 fits with and indexes the key blanks illustrated.

Figure 15B:
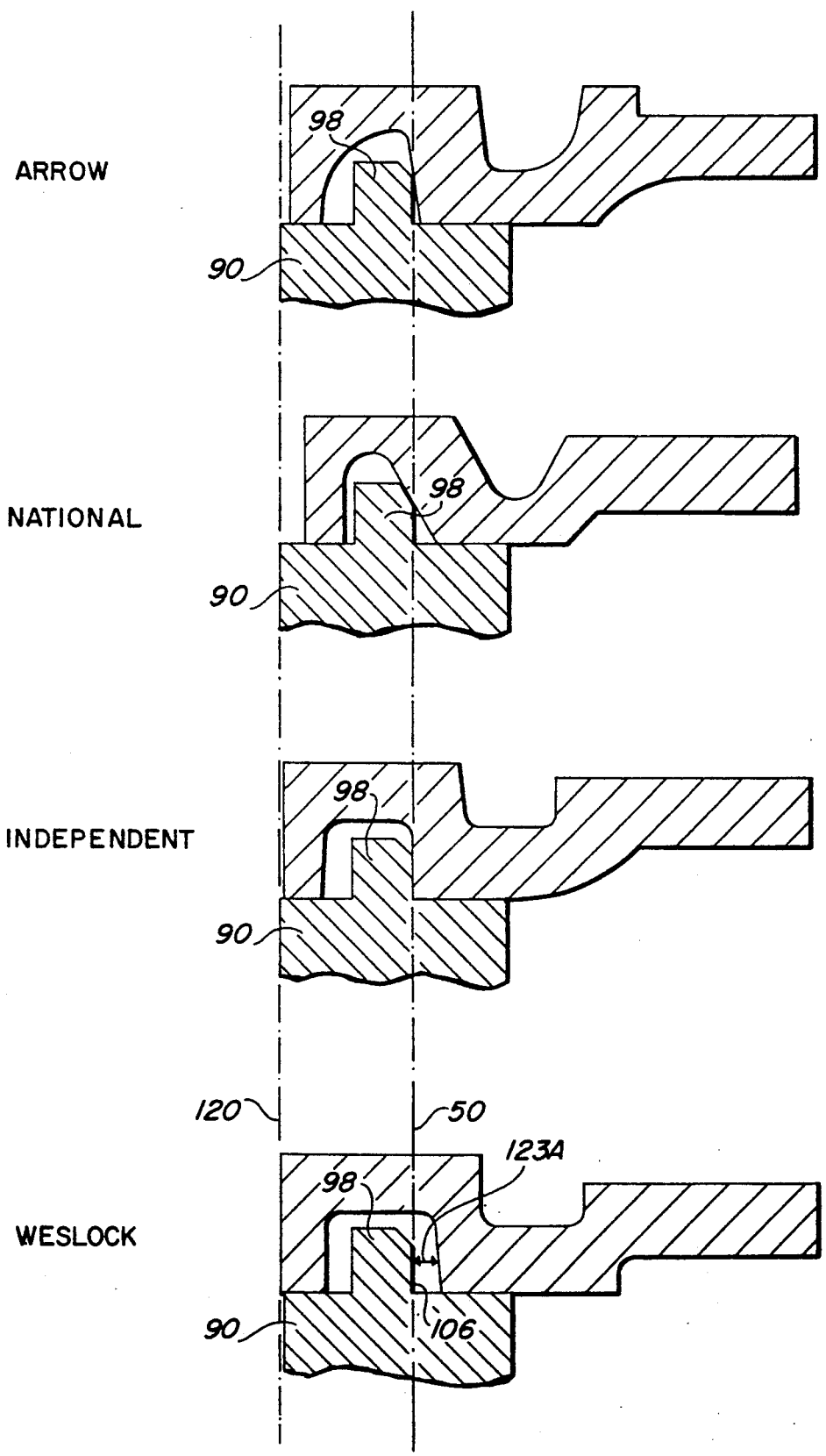
FIG. 15B illustrates the interrelationship of these keys with the key clamping jaws.
Figure 16:
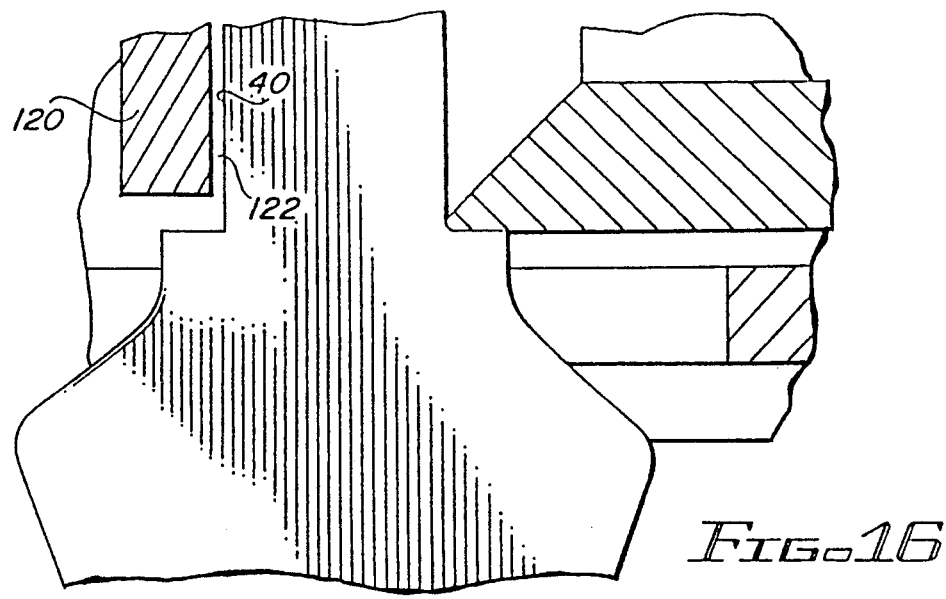
FIG. 16 is an elevational view showing a master key, or a key blank, positioned in the key clamp illustrated in FIGS. 8A or 8C.

As illustrated in FIGS. 15A, 15B and 16, the problems arising from the atypical structure and function of the Weslock key is overcome by utilizing clamping fixture lateral alignment block 120 which for all other universal key duplication applications maintains a gap 122 between the root 40 of the master keys and cassette alignment block.

When a Weslock master key 116 is placed into the clamping fixture, as shown in FIG. 16, the root 40 of the Weslock key actually engages and aligns itself on the abutting vertical surface of lateral alignment block 120.

Figure 1B:
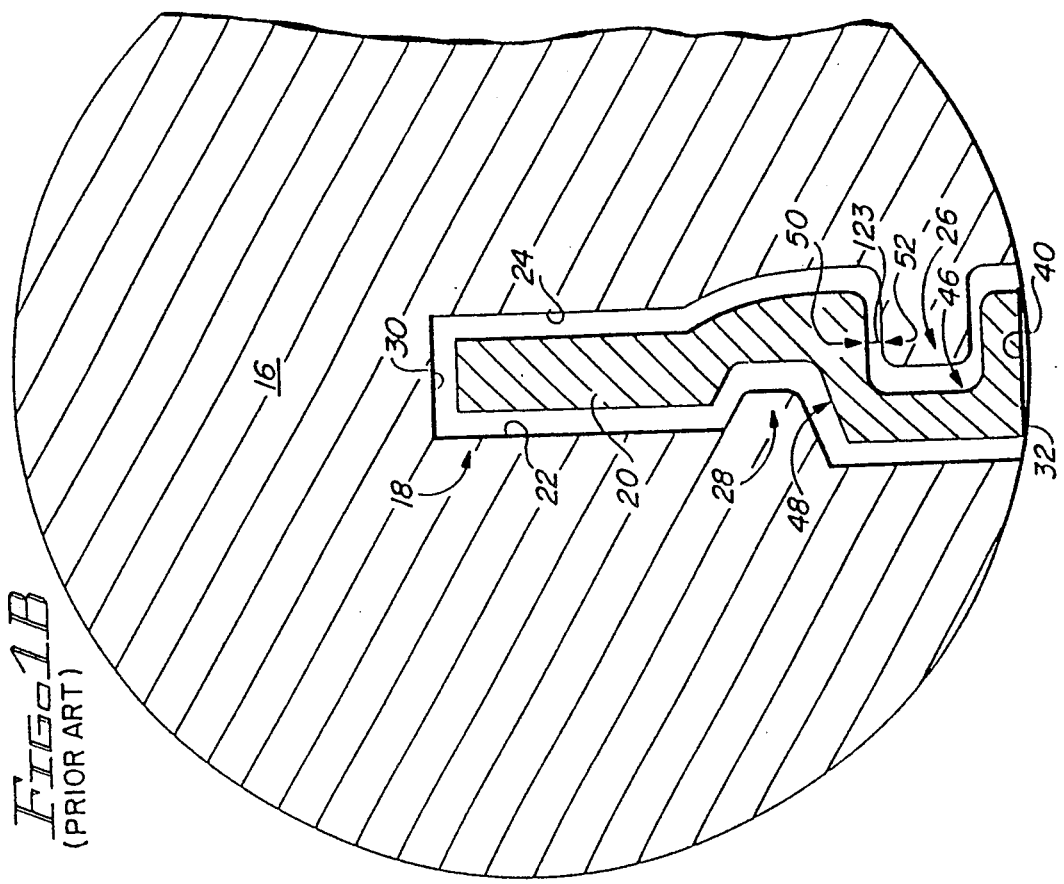
FIGS. 1A and B illustrate a conventional key inserted in the lock entrance slot of a rotary cylinder lock. In the FIG. 1B Weslock system, the key root contacts and is vertically indexed by the lower edge of the lock entrance slot.
Figure 1A:
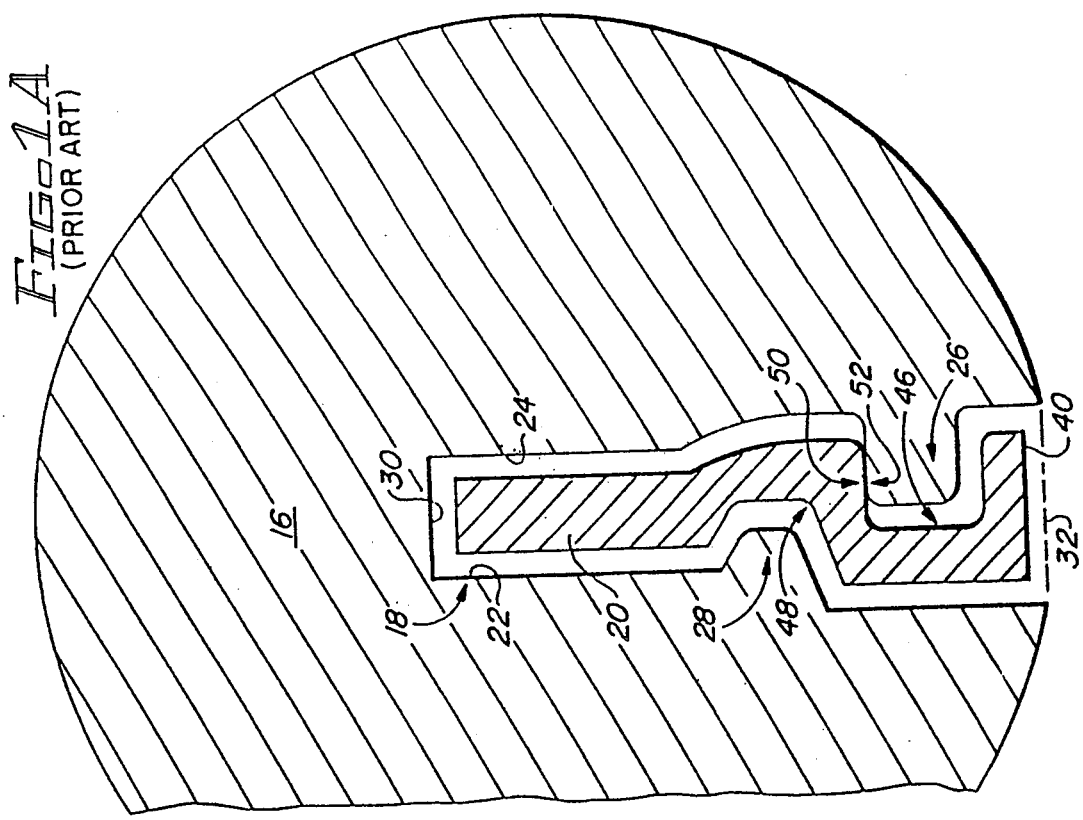

As illustrated in FIG. 1B, a defined and repeatable gap designated by reference number 123 exists between key reference surface 50 and lock reference surface 52 when the Weslock master key is inserted in the lock. As illustrated in FIG. 15A, to properly index the bit notch pattern on the universal key, an identical gap designated by reference number 123A must be reproduced between lateral alignment surface 106 of notch alignment surface 98 and the key reference surface 50 of the Weslock master key. This gap offsets the Weslock master key relative to the universal key blank and results in the proper indexing of the bit notch pattern of the universal key.

When the universal key copied from a Westlock master key is inserted in a Weslock lock, no gap exists between key reference surface 50 and lock reference surface 52, i.e., key reference surface 50 of the universal key 92 is vertically indexed by the lock reference surface 52 because the master key and key blank were offset during the cutting operation by a distance equal to the gap. In the Westlock system, the duplicated universal key is no longer root-reference and does contact lower edge 32 of lock entrance slot 16 of the Weslock lock.

Figure 17:
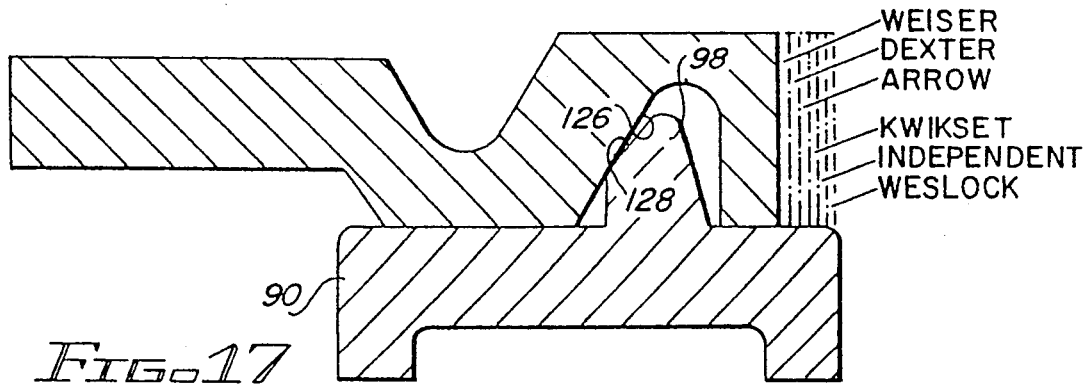
FIG. 17 illustrates how the master key notch alignment surface includes a bevelled edge for laterally indexing the key alignment surface of an Arrow or National master key.

As designated by reference numbers 124 and 126 in FIGS. 15A and B, the key reference surfaces of these two keys (the Arrow and National keys) are significantly angled and do not laterally index with notch alignment surface 98 as do the other master keys with non-angled key reference surfaces. As illustrated in FIGS. 8B and 11 and the enlarged depiction of FIG. 17, the lateral alignment surface 106 of notch alignment surface 98 has been provided with a bevelled edge 128 designated by trial and error as to angle and lateral placement to engage and index the Arrow and National keys to provide vertical indexing of the bit notch pattern of the universal key identical to that of the master key.

Because of the geometric dissimilarities among the seven master keys (see FIGS. 14 and 15) which the universal key blank replaces, the overall height of the blade 80 of uncut universal key blank 92 exceeds the height of the blade of some master keys and can exceed the height of the lock entrance slot of some locks. One additional function of the key duplication process is to recreate the blade height of a selected master key. This takes place in all applications as a direct result of duplicating the master key bit notch pattern at the reference distance of the master key which also provides the necessary vertical indexing and blade height control along the entire length of the key blade.

Figure 18:
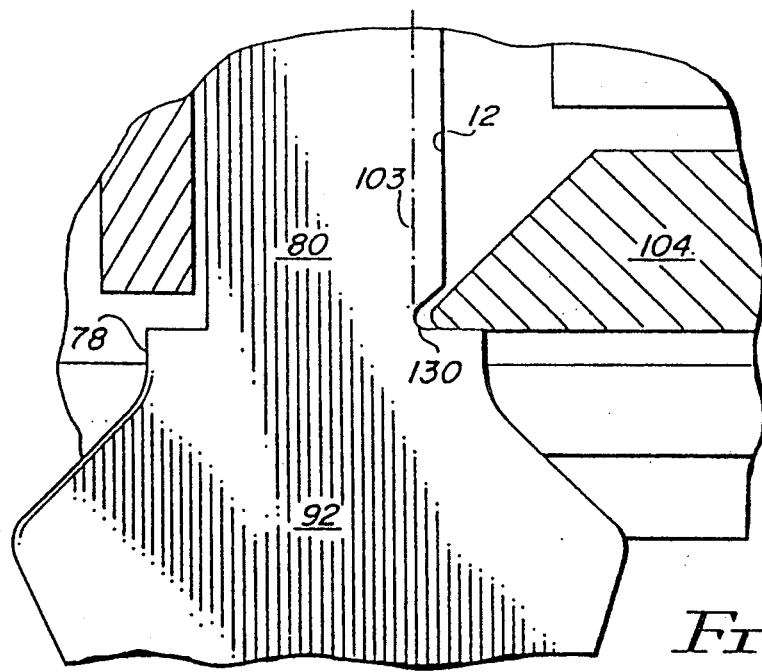
FIG. 18 illustrates a frangible notch provided in the universal key blank to accommodate variations in master key blade height.

As illustrated in FIGS. 18 and 19, the universal key blank includes a V-shaped notch 130 near where the blade 80 joins the key shoulder 78 enabling the key cutter 104 to break away the thinned plastic or metal section within notch 130 in response to an attempt to align key follower 102 with the reduced blade height of a selected master key. The dotted line designated by reference number 103 illustrates the maximum height reduction of the universal key 92. FIG. 19 illustrates an alternative embodiment of this blade height reduction mechanism which takes the form of a frangible notch or tang 132 which, when necessary, can readily be broken off or deflected by key cutter 104 in response to a lateral displacement of key follower 102 into contact with a master key having a blade height less than the universal key blade height.

FIGS. 20A and 20B represent sectional and elevational views of the universal key blank 92, particularly illustrating the specific dimensions and dimensional relationships of the preferred embodiment of the invention capable of replacing seven of the most common brand name house keys, but not Schlage and Yale master keys.

Table 1 below illustrates the dimensions of one preferred embodiment of the universal key of the present invention as shown in FIGS. 20A and 20B:

TABLE I

| Reference Number | Dimension |
| --- | --- |
| 140 | .077 inch |
| 142 | 7° |
| 144 | .070R inch |
| 146 | .030R inch |
| 148 | .025R inch |
| 150 | .0270 inch |
| 152 | .0410 inch |
| 154 | .0390 inch |
| 156 | .0850 inch |
| 158 | .035R inch |
| 160 | 75° |
| 162 | 110° |
| 164 | .1140 inch |
| 166 | .1420 inch |
| 168 | .3450 inch |
| 170 | 2.10 inch |
| 172 | .88 inch |
| 174 | 1.095 inch |
| 176 | .070 inch |
| 178 | 45° |
| 180 | .030R inch |
| 182 | .187R inch |
| 184 | .820 inch |
| 186 | 38° |
| 188 | .030R inch |
| 190 | .3450 inch |
| 192 | .150 inch |
| 194 | .2025 inch |
| 196 | .010R inch |

The universal key blank of the present invention can be manufactured out of brass, plastic or other equivalent materials and can readily be duplicated on appropriately referenced key duplication equipment. Prior art root-referenced key duplication equipment can readily be converted to sense the different reference relationship of the present key duplication method by providing a different type of clamp or bracket for referencing the key reference surface of the first groove of both the master and key blanks. Such clamp adapters could be readily designed and implemented by one of ordinary skill in the art pursuant to the teachings stated above.

It will be apparent to those skilled in the art that the disclosed universal key blank and key duplication method may be modified in numerous ways and may assume many embodiments other than the preferred forms specifically set out and described above. Accordingly, it is intended by the appended claims to cover all such modifications of the invention which fall within the true spirit and scope of the invention.

I claim:

1. A universal key blank capable of being cut to operate both a first category lock actuated by a first compatible key and a second category lock actuated by a second compatible key geometrically dissimilar to the first key and incompatible with the first lock, the first and second keys each including a head, a shoulder abutting the head, a longitudinally extending blade coupled to the shoulder and including a root and a single bitted surface, the blade having a length, a width, first and second opposing sides and only a single unique bit notch pattern for actuating the compatible lock, each key further including first and second vertically displaced, longitudinally extending grooves formed in the opposing sides of the blade, the first groove including a key reference surface for engaging a lock reference surface and for defining a reference distance between the bit notch pattern and the key reference surface, the first groove formed in the first side of the blade and including a C-shaped channel having a first end surface defined by the key reference surface and a second end surface defined by the root and the second groove formed in the second side of the blade and including a C-shaped channel, the first and second locks each including a lock entrance slot having opposing sides and first and second opposed key interface ribs protruding from the opposing sides of the slot with relative vertical alignment and rib geometry configured to engage the first and second grooves of the compatible key, the lock reference surface forming a part of the first key interface rib, the entrance slot of the lock being dimensioned to permit penetration of the blade but not the shoulder of the compatible key to thereby longitudinally align the single bit notch pattern of the key with the compatible lock, the universal key blank comprising:

a. a head;

b. a shoulder abutting the head and dimensioned to prevent penetration of the shoulder into the lock entrance slot of both the first and second locks; and c. a blade coupled to the shoulder, including only a single bitted surface and having a length and a height adequate to receive a bit notch pattern duplicating the bit notch pattern of either the first or the second key, the blade having first and second opposing sides and a width enabling the blade to be inserted through the entrance slot of both the first and second locks, the blade further including a first longitudinal groove formed in the first side of the blade and including a substantially L-shaped channel defining a key blank reference surface and a second longitudinal groove formed in the second side of the blade and defining a C-shaped channel, the first and second grooves configured to penetrate through the entrance slot of both the first and second locks such that the key blank reference surface engages the reference surface of the selected lock to define a duplicate reference distance between the duplicated bit notch pattern on the key blank and the key blank reference surface equal to the reference distance of the duplicated key enabling the duplicated notch pattern on the universal key blank to actuate the lock actuated by the duplicated key.

2. The universal key blank of claim 1 wherein the first groove is formed without a root.

3. The universal key blank of claim 2 wherein the L-shaped channel of the first groove is defined by the key blank reference surface and an adjacent surface.

4. The universal key blank of claim 3 wherein the key blank reference surface and the adjacent surface are separated by an angle of about ninety degrees.

5. The universal key blank of claim 3 wherein the C-shaped surface of the second groove of the key blank is defined by a first end surface, a second end surface and a central surface interconnecting the first and second end surfaces.

6. The universal key blank of claim 5 wherein the central surface of the second groove of the key blank laterally penetrates into the second side of the blade to a lateral distance beyond the lateral penetration of the adjacent surface of the first groove into the first side of the blade.

* * * * *